(12) United States Patent
Tyler et al.

(10) Patent No.: US 10,345,068 B2
(45) Date of Patent: Jul. 9, 2019

(54) COMPOSITE SPORTING EQUIPMENT (71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: CC3D LLC, Coeur d'Alene, ID (US)

( * ) Notice: Subject to any disclaimer, the term of this patent is extended or adjusted under 35 U.S.C. 154(b) by 0 days.

(21) Appl. No.: 15/880,605

(22) Filed: Jan. 26, 2018

(65) Prior Publication Data

US 2018/0231347 A1 Aug. 16, 2018

Related U.S. Application Data

(60) Provisional application No. 62/458,328, filed on Feb. 13, 2017.

(51) Int. Cl.
*F41A 21/02* (2006.01)
*B29C 70/72* (2006.01)
(Continued)

(52) U.S. Cl.
CPC ............. *F41A 21/02* (2013.01); *A63B 49/00* (2013.01); *A63B 49/02* (2013.01); *A63B 49/10* (2013.01); *A63B 53/10* (2013.01); *A63B 53/14* (2013.01); *A63B 60/00* (2015.10); *A63B 60/08* (2015.10); *A63B 60/42* (2015.10); *A63B 71/0622* (2013.01); *A63B 71/12* (2013.01); *A63C 5/052* (2013.01); *A63C 5/06* (2013.01); *A63C 5/075* (2013.01); *A63C 5/12* (2013.01); *A63C 11/003* (2013.01); *B29C 64/165* (2017.08); *B29C 70/08* (2013.01); *B29C 70/382* (2013.01); *B29C 70/384* (2013.01);
*B29C 70/70* (2013.01); *B29C 70/72* (2013.01); *B29C 70/86* (2013.01); *B33Y 10/00* (2014.12); *D03D 3/02* (2013.01); *F41A 3/66* (2013.01); *F41A 21/18* (2013.01);
(Continued)

(58) Field of Classification Search
CPC ............. F41C 23/18; F41A 3/66; F41A 21/02
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
DE 102006035274 A1 2/2008
(Continued)

OTHER PUBLICATIONS

"What did I stumble upon here: HK Fabarm FP6 Carbon Fiber 12 gauge", https://www.ar15.com/forums/armory/What_did_I_stumble_upon_here_HK_Fabarm_FP6_Carbon_Fiber_12_gauge_pump/2-411707/[Oct. 2, 2018, pp. 1 and 2, (Year: 2013).*
(Continued)

*Primary Examiner* — Joshua T Semick
(74) *Attorney, Agent, or Firm* — Ryan C. Stockett (57) ABSTRACT

A sporting equipment is disclosed. The sporting equipment may include a barrel, an action connected to a base end of the barrel, and a stock connected to the action opposite the barrel. At least two of the barrel, the action, and the stock are fabricated from a plurality of fibers.

18 Claims, 2 Drawing Sheets

(51) Int. Cl.

| | |
|---|---|
| *F41A 3/66* | (2006.01) |
| *F41C 23/18* | (2006.01) |
| *A63B 60/08* | (2015.01) |
| *A63B 49/02* | (2015.01) |
| *A63B 49/10* | (2015.01) |
| *A63B 53/14* | (2015.01) |
| *B33Y 10/00* | (2015.01) |
| *B29C 64/165* | (2017.01) |
| *A63B 71/06* | (2006.01) |
| *A63C 5/052* | (2006.01) |
| *A63C 5/06* | (2006.01) |
| *A63C 5/12* | (2006.01) |
| *A63C 11/00* | (2006.01) |
| *A63B 71/12* | (2006.01) |
| *B29C 70/08* | (2006.01) |
| *B29C 70/38* | (2006.01) |
| *D03D 3/02* | (2006.01) |
| *G01L 5/00* | (2006.01) |
| *F41A 21/18* | (2006.01) |
| *B29C 70/86* | (2006.01) |
| *A63B 49/00* | (2015.01) |
| *B29C 70/70* | (2006.01) |
| *A63B 53/10* | (2015.01) |
| *A63B 60/00* | (2015.01) |
| *A63B 60/42* | (2015.01) |
| *A63C 5/075* | (2006.01) |
| *B29L 31/52* | (2006.01) |
| *B29C 70/88* | (2006.01) |
| *A63B 102/22* | (2015.01) |
| *A63B 102/24* | (2015.01) |
| *A63B 102/34* | (2015.01) |
| *A63B 24/00* | (2006.01) |
| *B33Y 80/00* | (2015.01) |
| *B29K 105/08* | (2006.01) |
| *B29K 707/04* | (2006.01) |
| *B29K 709/08* | (2006.01) |
| *B29L 31/48* | (2006.01) |

(52) U.S. Cl.
CPC ............ *F41C 23/18* (2013.01); *G01L 5/0052* (2013.01); *A63B 24/0062* (2013.01); *A63B 71/06* (2013.01); *A63B 2071/0658* (2013.01); *A63B 2102/22* (2015.10); *A63B 2102/24* (2015.10); *A63B 2102/34* (2015.10); *A63B 2207/02* (2013.01); *A63B 2208/03* (2013.01); *A63B 2209/00* (2013.01); *A63B 2209/023* (2013.01); *A63B 2220/51* (2013.01); *A63B 2220/54* (2013.01); *A63B 2220/805* (2013.01); *A63B 2244/18* (2013.01); *A63B 2244/19* (2013.01); *A63C 2203/14* (2013.01); *A63C 2203/18* (2013.01); *B29C 70/88* (2013.01); *B29K 2105/08* (2013.01); *B29K 2677/10* (2013.01); *B29K 2707/04* (2013.01); *B29K 2709/08* (2013.01); *B29K 2995/0063* (2013.01); *B29K 2995/0082* (2013.01); *B29L 2031/48* (2013.01); *B29L 2031/52* (2013.01); *B33Y 80/00* (2014.12); *D10B 2101/06* (2013.01); *D10B 2101/12* (2013.01); *D10B 2331/02* (2013.01); *D10B 2401/061* (2013.01); *D10B 2401/062* (2013.01); *D10B 2403/02* (2013.01); *D10B 2501/00* (2013.01); *D10B 2507/00* (2013.01)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,399,854 A * | 3/1995 | Dunphy | G01K 5/72 250/227.14 |
| 5,530,966 A | 7/1996 | West | |
| 5,590,908 A | 1/1997 | Carr | |
| 5,746,967 A | 5/1998 | Hoy et al. | |
| 5,775,715 A | 7/1998 | Vandergrift | |
| 5,809,861 A | 9/1998 | Hummel | |
| 5,866,058 A | 2/1999 | Batchelder et al. | |
| 5,936,861 A | 8/1999 | Jang et al. | |
| 6,153,034 A | 11/2000 | Lipsker | |
| 6,381,482 B1 | 4/2002 | Jayaraman et al. | |
| 6,459,069 B1 | 10/2002 | Rabinovich | |
| 6,501,554 B1 | 12/2002 | Hackney et al. | |
| 6,595,938 B1 | 7/2003 | Delmore et al. | |
| 6,799,081 B1 | 9/2004 | Hale et al. | |
| 6,803,003 B2 | 10/2004 | Rigali et al. | |
| 6,889,464 B2 * | 5/2005 | Degerness | F41A 21/02 42/76.01 |
| 6,924,021 B1 * | 8/2005 | Colegrove | B32B 5/12 428/131 |
| 6,934,600 B2 | 8/2005 | Jang et al. | |
| 7,039,485 B2 | 5/2006 | Engelbart et al. | |
| 7,043,766 B1 | 5/2006 | Foreman et al. | |
| 7,080,849 B2 | 7/2006 | Lammer | |
| 7,555,404 B2 | 6/2009 | Brennan et al. | |
| 7,795,349 B2 | 9/2010 | Bredt et al. | |
| 7,814,695 B1 * | 10/2010 | Keeney | F41A 3/66 42/71.01 |
| 8,141,287 B2 * | 3/2012 | Dubois | F41A 21/482 42/75.01 |
| 8,176,667 B2 * | 5/2012 | Kamal | F41C 23/22 42/1.01 |
| 8,221,669 B2 | 7/2012 | Batchelder et al. | |
| 8,223,019 B2 * | 7/2012 | August | F41A 17/063 340/572.1 |
| 8,365,647 B2 * | 2/2013 | Lippard | B23D 77/14 42/76.1 |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,285,178 B2 * | 3/2016 | Sellars | F41A 21/485 |
| 9,297,599 B2 * | 3/2016 | Underwood | F41A 3/66 |
| 9,327,452 B2 | 5/2016 | Mark et al. | |
| 9,327,453 B2 | 5/2016 | Mark et al. | |
| 9,341,429 B1 * | 5/2016 | Reavis, III | F41A 35/02 |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,664,465 B1 * | 5/2017 | Viviano | F41A 3/26 |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 9,863,732 B2 * | 1/2018 | Curliss | F41A 21/02 |
| 10,054,379 B2 * | 8/2018 | Lammers | F41A 5/26 |

(56) References Cited

U.S. PATENT DOCUMENTS

| | | | |
|---|---|---|---|
| 10,168,117 B2* | 1/2019 | Curliss | F41A 21/02 |
| 2001/0001770 A1 | 5/2001 | Spangler et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0192351 A1 | 10/2003 | Meckley et al. | |
| 2003/0236588 A1 | 12/2003 | Jang et al. | |
| 2004/0019950 A1 | 2/2004 | Rast | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0150254 A1 | 6/2008 | Inge | |
| 2008/0176092 A1 | 7/2008 | Owens | |
| 2009/0095410 A1 | 4/2009 | Oldani | |
| 2010/0162604 A1 | 7/2010 | Dubois | |
| 2010/0190586 A1 | 7/2010 | House | |
| 2011/0032301 A1 | 2/2011 | Fienup et al. | |
| 2011/0070968 A1 | 3/2011 | Stites | |
| 2011/0136602 A1 | 6/2011 | Hsu et al. | |
| 2011/0143108 A1 | 6/2011 | Fruth et al. | |
| 2012/0060468 A1 | 3/2012 | Dushku et al. | |
| 2012/0115631 A1 | 5/2012 | Tseng et al. | |
| 2012/0159785 A1 | 6/2012 | Pyles et al. | |
| 2012/0231225 A1 | 9/2012 | Mikulak et al. | |
| 2012/0233740 A1 | 9/2012 | Veillet | |
| 2012/0247655 A1 | 10/2012 | Erb et al. | |
| 2012/0276309 A1 | 11/2012 | Failing | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0020192 A1 | 1/2014 | Jones et al. | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0297973 A1 | 10/2015 | Beers | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0258713 A1* | 9/2016 | Huang | F41A 3/66 |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0320156 A1* | 11/2016 | Curliss | F41A 21/02 |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0341517 A1 | 11/2016 | Williams | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 | 1/2017 | Mason et al. | |
| 2017/0008333 A1 | 1/2017 | Mason et al. | |
| 2017/0015059 A1 | 1/2017 | Lewicki | |
| 2017/0015060 A1 | 1/2017 | Lewicki et al. | |
| 2017/0021565 A1 | 1/2017 | Deaville | |
| 2017/0028434 A1 | 2/2017 | Evans et al. | |
| 2017/0028588 A1 | 2/2017 | Evans et al. | |
| 2017/0028617 A1 | 2/2017 | Evans et al. | |
| 2017/0028619 A1 | 2/2017 | Evans et al. | |
| 2017/0028620 A1 | 2/2017 | Evans et al. | |
| 2017/0028621 A1 | 2/2017 | Evans et al. | |
| 2017/0028623 A1 | 2/2017 | Evans et al. | |
| 2017/0028624 A1 | 2/2017 | Evans et al. | |
| 2017/0028625 A1 | 2/2017 | Evans et al. | |
| 2017/0028627 A1 | 2/2017 | Evans et al. | |
| 2017/0028628 A1 | 2/2017 | Evans et al. | |
| 2017/0028633 A1 | 2/2017 | Evans et al. | |
| 2017/0028634 A1 | 2/2017 | Evans et al. | |
| 2017/0028635 A1 | 2/2017 | Evans et al. | |
| 2017/0028636 A1 | 2/2017 | Evans et al. | |
| 2017/0028637 A1 | 2/2017 | Evans et al. | |
| 2017/0028638 A1 | 2/2017 | Evans et al. | |
| 2017/0028639 A1 | 2/2017 | Evans et al. | |
| 2017/0028644 A1 | 2/2017 | Evans et al. | |
| 2017/0030207 A1 | 2/2017 | Kittleson | |
| 2017/0036403 A1 | 2/2017 | Ruff et al. | |
| 2017/0050340 A1 | 2/2017 | Hollander | |
| 2017/0057164 A1 | 3/2017 | Hemphill et al. | |
| 2017/0057165 A1 | 3/2017 | Waldrop et al. | |
| 2017/0057167 A1 | 3/2017 | Tooren et al. | |
| 2017/0057181 A1 | 3/2017 | Waldrop et al. | |
| 2017/0064840 A1 | 3/2017 | Espalin et al. | |
| 2017/0066187 A1 | 3/2017 | Mark et al. | |
| 2017/0087768 A1 | 3/2017 | Bheda | |
| 2017/0106565 A1 | 4/2017 | Braley et al. | |
| 2017/0120519 A1 | 5/2017 | Mark | |
| 2017/0129170 A1 | 5/2017 | Kim et al. | |
| 2017/0129171 A1 | 5/2017 | Gardner et al. | |
| 2017/0129176 A1 | 5/2017 | Waatti et al. | |
| 2017/0129182 A1 | 5/2017 | Sauti et al. | |
| 2017/0129186 A1 | 5/2017 | Sauti et al. | |
| 2017/0144375 A1 | 5/2017 | Waldrop et al. | |
| 2017/0151728 A1 | 6/2017 | Kunc et al. | |
| 2017/0157828 A1 | 6/2017 | Mandel et al. | |
| 2017/0157831 A1 | 6/2017 | Mandel et al. | |
| 2017/0157844 A1 | 6/2017 | Mandel et al. | |
| 2017/0157851 A1 | 6/2017 | Nardiello et al. | |
| 2017/0165908 A1 | 6/2017 | Pattinson et al. | |
| 2017/0173868 A1 | 6/2017 | Mark | |
| 2017/0182712 A1 | 6/2017 | Scribner et al. | |
| 2017/0210074 A1 | 7/2017 | Ueda et al. | |
| 2017/0217088 A1 | 8/2017 | Boyd et al. | |
| 2017/0232674 A1 | 8/2017 | Mark | |
| 2017/0259502 A1 | 9/2017 | Chapiro et al. | |
| 2017/0259507 A1 | 9/2017 | Hocker | |
| 2017/0266876 A1 | 9/2017 | Hocker | |
| 2017/0274585 A1 | 9/2017 | Armijo et al. | |
| 2017/0284876 A1 | 10/2017 | Moorlag et al. | |

FOREIGN PATENT DOCUMENTS

| | | |
|---|---|---|
| EP | 2589481 B1 | 1/2016 |
| EP | 3219474 A1 | 9/2017 |
| EP | 3231488 A1 | 10/2017 |

(56) References Cited

FOREIGN PATENT DOCUMENTS

| KR | 100995983 B1 | 11/2010 |
| KR | 101172859 B1 | 8/2012 |
| WO | 2005047801 A2 | 5/2005 |
| WO | 2008149183 A1 | 12/2008 |
| WO | 2013017284 A2 | 2/2013 |
| WO | 2016088042 A1 | 6/2016 |
| WO | 2016088048 A1 | 6/2016 |
| WO | 2016092132 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

Greenberg, Andy, "Gun Group: We'll Pay $15K for Your Carbon Fiber 3-D Printer", Wired, https://www.wired.com/2015/03/gun-group-well-pay-15k-carbon-fiber-3-d-printer, Mar. 3, 2015.*
International Search Report dated Apr. 5, 2018 for PCT/US2018/015720 to CC3D LLC Filed Jan. 29, 2018.
A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
A. Endruweit, M. S. Johnson, & A. C. Long, Curing of Composite Components by Ultraviolet Radiation: A Review, Polymer Composites, pp. 119-128 (Apr. 2006).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
International Search Report dated Apr. 19, 2018 for PCT/US2018/015353 to CC3D LLC Filed Jan. 26, 2018.

* cited by examiner

COMPOSITE SPORTING EQUIPMENT

RELATED APPLICATIONS

This application is based on and claims the benefit of priority from U.S. Provisional Application No. 62/458,328 that was filed on Feb. 13, 2017, the contents of which are expressly incorporated herein by reference.

TECHNICAL FIELD

The present disclosure relates generally to sporting equipment and, more particularly, to sporting equipment made from a composite material via additive manufacturing.

BACKGROUND

Unique equipment is available for most any sport. For example, a racket may be used to play tennis, a club may be used to play golf, body armor may be used for motocross, a gun may be used for skeet or biathlon events, etc. Often, a quality of the equipment used during a sporting event can affect an outcome of the event. For example, a weight of the equipment, a strength of the equipment, a shape of the equipment, a flexibility of the equipment, a hardness of the equipment, a durability of the equipment, a conformability of the equipment, etc., can directly affect an acceleration, a speed, a distance, a force, an accuracy, a repeatability, a longevity, and other performance parameters. Unfortunately, conventional manufacturing capabilities may limit the available quality of conventional sporting equipment.

Some sporting equipment is manufactured from composite materials, which can enhance the quality of the equipment. For example, the frame of a tennis racket, the handle of a golf club, and the stock of a gun have been made from fiberglass, Kevlar, and carbon fibers using a vacuum-mold technique or a pultrusion process. Thereafter, the composite components are joined to other non-composite components (e.g., to strings, a head, a grip, a barrel, an action, etc.) using conventional techniques (e.g., gluing, welding, mechanical fastening, etc.). Sporting goods made from composite materials may have a reduced weight and/or increased strength or stiffness.

Although sporting equipment having composite components may have improved qualities, the associated benefits may be limited. In particular, the quality may be interrupted because of the conventional joining techniques used to connect the composite components to the associated non-composite components. In addition, conventional vacuum-mold techniques and pultrusion processes may limit the shape, size, and/or configuration possible within the composite components. In addition, it may be beneficial, in some applications, to receive feedback from the sporting equipment; and this may not be possible using conventionally manufactured equipment.

The disclosed sporting equipment is directed to overcoming one or more of the problems set forth above and/or other problems of the prior art.

SUMMARY

In one aspect, the present disclosure is directed to a sporting equipment. The sporting equipment may include a barrel, an action connected to a base end of the barrel, and a stock connected to the action opposite the barrel. At least two of the barrel, the action, and the stock are fabricated from a plurality of fibers.

In another aspect, the present disclosure is directed to a method of fabricating a sporting equipment. This method may include wetting a continuous fiber with a matrix, and discharging a matrix-wetted continuous fiber through a nozzle. The method may also include moving the nozzle during discharging to extend the matrix-wetted continuous fiber through at least two of a barrel, an action, and a stock of a gun. The method may further include curing a matrix in the matrix-wetted continuous fiber.

DETAILED DESCRIPTION

Figure 1:
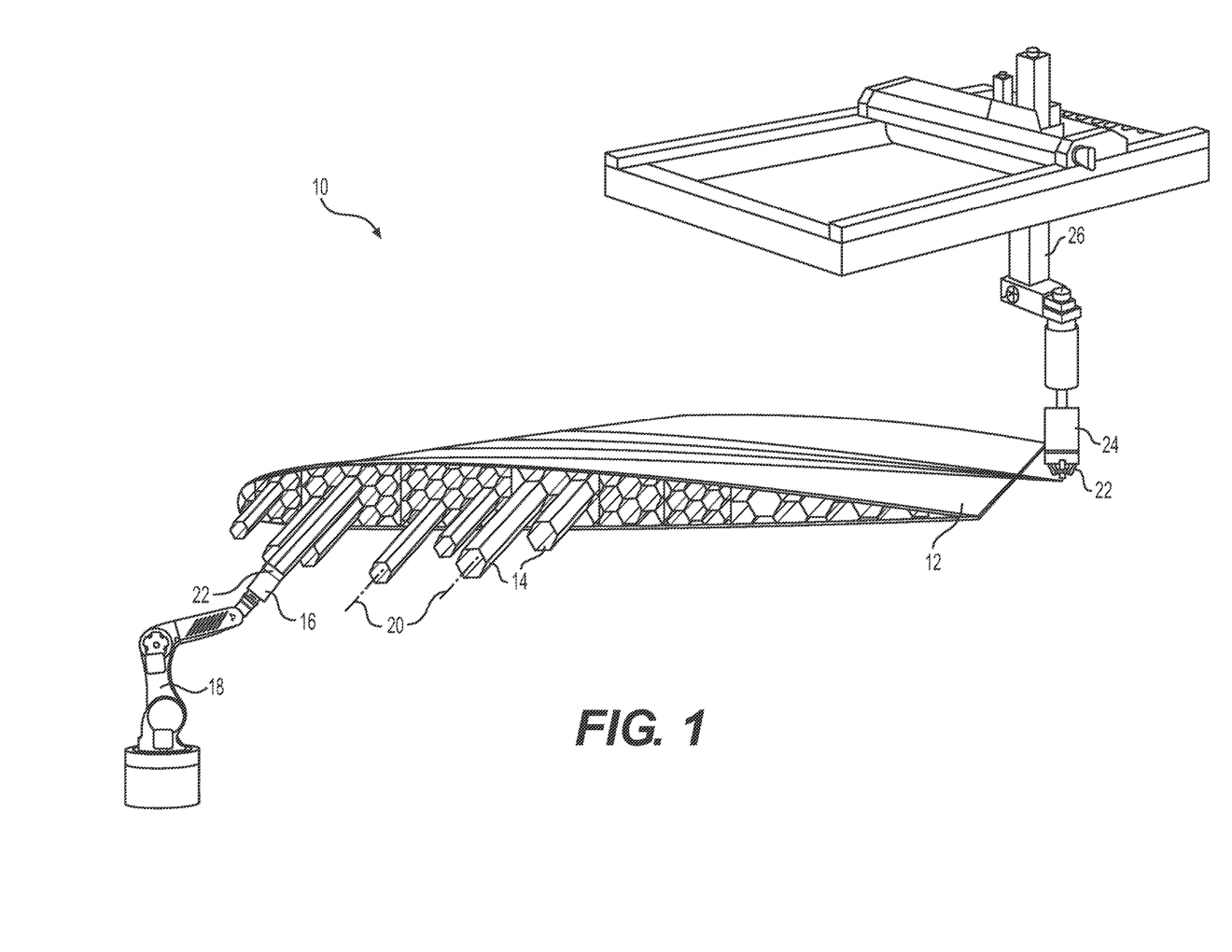
FIG. 1 is a diagrammatic illustration of an exemplary system for manufacturing sporting equipment.

FIG. 1 illustrates an exemplary system 10 for additively manufacturing sporting equipment 12. System 10 may implement any number of different additive processes during manufacture of sporting equipment 12. For example, sporting equipment 12 is shown in FIG. 1 as being manufactured via a first additive process and via a second additive process. It should be noted that the first and second additive processes may be performed simultaneously or consecutively, as desired. It should also be noted that sporting equipment 12 may be manufactured utilizing only one of the first and second additive processes.

The first additive process (represented in the lower-left of FIG. 1) may be a pultrusion and/or extrusion process, which creates hollow tubular structures 14 from a composite material (e.g., a material having a matrix and at least one continuous fiber). One or more heads 16 may be coupled to a support 18 (e.g., to a robotic arm) that is capable of moving head(s) 16 in multiple directions during discharge of structures 14, such that resulting longitudinal axes 20 of structures 14 are three-dimensional. Such a head is disclosed, for example, in U.S. patent application Ser. Nos. 15/130,412 and 15/130,207, all of which are incorporated herein in their entireties by reference.

Head(s) 16 may be configured to receive or otherwise contain the matrix material. The matrix material may include any type of liquid resin (e.g., a zero-volatile organic compound resin) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the pressure of the matrix material inside of head(s) 16 may be generated by an external device (e.g., an extruder or another type of pump) that is fluidly connected to head(s) 16 via corresponding conduits (not shown). In another embodiment, however, the pressure may be generated completely inside of head(s) 16 by a similar type of device and/or simply be the result of gravity acting on the matrix material. In some instances, the matrix material inside head(s) 16 may need to be kept cool and/or dark, in order to inhibit premature curing; while in other instances, the matrix material may need to be kept warm for the same reason. In either situation, head(s) 16 may be specially configured (e.g., insulated, chilled, and/or warmed) to provide for these needs.

The matrix material stored inside head(s) 16 may be used to coat any number of continuous fibers and, together with the fibers make up walls of composite structures 14. The fibers may include single strands, a tow or roving of several strands, or a weave of many strands. The strands may include, for example, carbon fibers, vegetable fibers, wood fibers, mineral fibers, glass fibers, metallic wires, ceramic fibers, basalt fibers, etc. The fibers may be coated with the matrix material while the fibers are inside head(s) 16, while the fibers are being passed to head(s) 16, and/or while the fibers are discharging from head(s) 16, as desired. In some embodiments, a filler material (e.g., chopped fibers) may be mixed with the matrix material before and/or after the matrix material coats the fibers. The matrix material, the dry fibers, fibers already coated with the matrix material, and/or the filler may be transported into head(s) 16 in any manner apparent to one skilled in the art. The matrix-coated fibers may then pass over a centralized diverter (not shown) located at a mouth of head(s) 16, where the resin is caused to cure (e.g., from the inside-out, from the outside-in, or both) by way of one or more cure enhancers (e.g., UV lights, ultrasonic emitters, microwave generators, infrared heaters, chillers, etc.) 22.

In embodiments where sporting equipment 12 is made up of multiple structures 14, each structure 14 may be discharged adjacent another structure 14 and/or overlap a previously discharged structure 14. In this arrangement, subsequent curing of the liquid resin within neighboring structures 14 may bond structures 14 together. Any number of structures 14 may be grouped together and have any trajectory, shape, and size required to generate the desired shape of sporting equipment 12.

In some embodiments, a fill material (e.g., an insulator, a conductor, an optic, a surface finish, etc.) could be deposited inside and/or outside of structures 14, while structures 14 are being formed. For example, a hollow shaft (not shown) could extend through a center of and/or over any of the associated head(s) 16. A supply of material (e.g., a liquid supply, a foam supply, a solid supply, a gas supply, etc.) could then be connected with an end of the hollow shaft, and the material forced through the hollow shaft and onto particular surfaces (i.e., interior and/or exterior surfaces) of structure 14. It is contemplated that the same cure enhancer(s) 22 used to cure structure 14 could also be used to cure the fill material, if desired, or that additional dedicated cure enhancer(s) (not shown) could be used for this purpose. The fill materials could allow one or more of structures 14 to function as tanks, passages, conduits, ducts, etc.

The second additive manufacturing process (represented in the upper-right of FIG. 1) may also be a pultrusion and/or extrusion process. However, instead of discharging hollow tubular structures 14, the second additive manufacturing process may be used to discharge tracks, ribbons, and/or sheets of composite material (e.g., over tubular structures 14 and/or over other features of sporting equipment 12). In particular, one or more heads 24 may be coupled to a support 26 (e.g., to an overhead gantry) that is capable of moving head(s) 24 in multiple directions during fabrication of sporting equipment 12, such that resulting contours of sporting equipment 12 are multi-dimensional (e.g., three-dimensional).

Head 24 may be similar to head 16 and configured to receive or otherwise contain a matrix material (e.g., the same matrix material contained within head 16 or a different matrix material). The matrix material stored inside head(s) 24 may be used to coat any number of separate fibers, allowing the fibers to make up centralized reinforcements of the discharging tracks, ribbons, and/or sheets. The fibers may include single strands, a tow or roving of several strands, or a weave of multiple strands. The strands may include, for example, carbon fibers, vegetable fibers, wood fibers, mineral fibers, glass fibers, metallic wires, etc. The fibers may be coated with the matrix material while the fibers are inside head(s) 24, while the fibers are being passed to head(s) 24, and/or while the fibers are discharging from head(s) 24, as desired. The matrix material, the dry fibers, and/or fibers already coated with the matrix material may be transported into head(s) 24 in any manner apparent to one skilled in the art. The matrix-coated fibers may then pass through one or more circular orifices, rectangular orifices, triangular orifices, or orifices of another curved or polygonal shape, where the fibers are pressed together and the matrix is caused to cure by way of one or more cure enhancers 22.

As described above, the first and second additive manufacturing processes can be extrusion or pultrusion processes. For example, extrusion may occur when the liquid matrix and the associated continuous fibers are pushed from head(s) 16 and/or head(s) 24 during the movement of supports 18 and/or 26. Pultrusion may occur after a length of matrix-coated fibers is connected to an anchor (not shown) and cured, followed by movement of head(s) 16 and/or head(s) 24 away from the anchor. The movement of head(s) 16 and/or head(s) 24 away from the anchor may cause the fibers to be pulled from the respective head(s), along with the coating of the matrix material.

In some embodiments, pultrusion may be selectively implemented to generate tension in the fibers that make up sporting equipment 12 and that remains after curing. In particular, as the fibers are being pulled from the respective head(s), the fibers may be caused to stretch. This stretching may create tension within the fibers. As long as the matrix surrounding the fibers cures and hardens while the fibers are stretched, at least some of this tension may remain in the fibers and function to increase a strength of the resulting composite structure.

Structures fabricated via conventional pultrusion methods may have increased strength in only a single direction (e.g., in the single direction in which fibers were pulled through the corresponding die prior to resin impregnation and curing). However, in the disclosed embodiment, the increased strength in sporting equipment 12 caused by residual tension within the corresponding fibers may be realized in the axial direction of each of the fibers. And because each fiber could be pulled in a different direction during discharge from head(s) 16 and/or 24, the tension-related strength increase may be realized in multiple (e.g., innumerable) different directions.

Structures fabricated via conventional pultrusion methods may have strength increased to only a single level (e.g., to a level proportionate to an amount in which the fibers were stretched by a pulling machine prior to resin impregnation and curing). However, in the disclosed embodiment, because the matrix surrounding each fiber may be cured and harden immediately upon discharge, the force pulling on the fiber may be continuously varied along the length of the fiber, such that different segments of the same fiber are stretched by different amounts. Accordingly, the residual tensile stress induced within each of the different segments of each different fiber may also vary, resulting in a variable strength within different areas of sporting equipment 12. This may be beneficial in variably loaded areas of sporting equipment 12.

Figure 2:
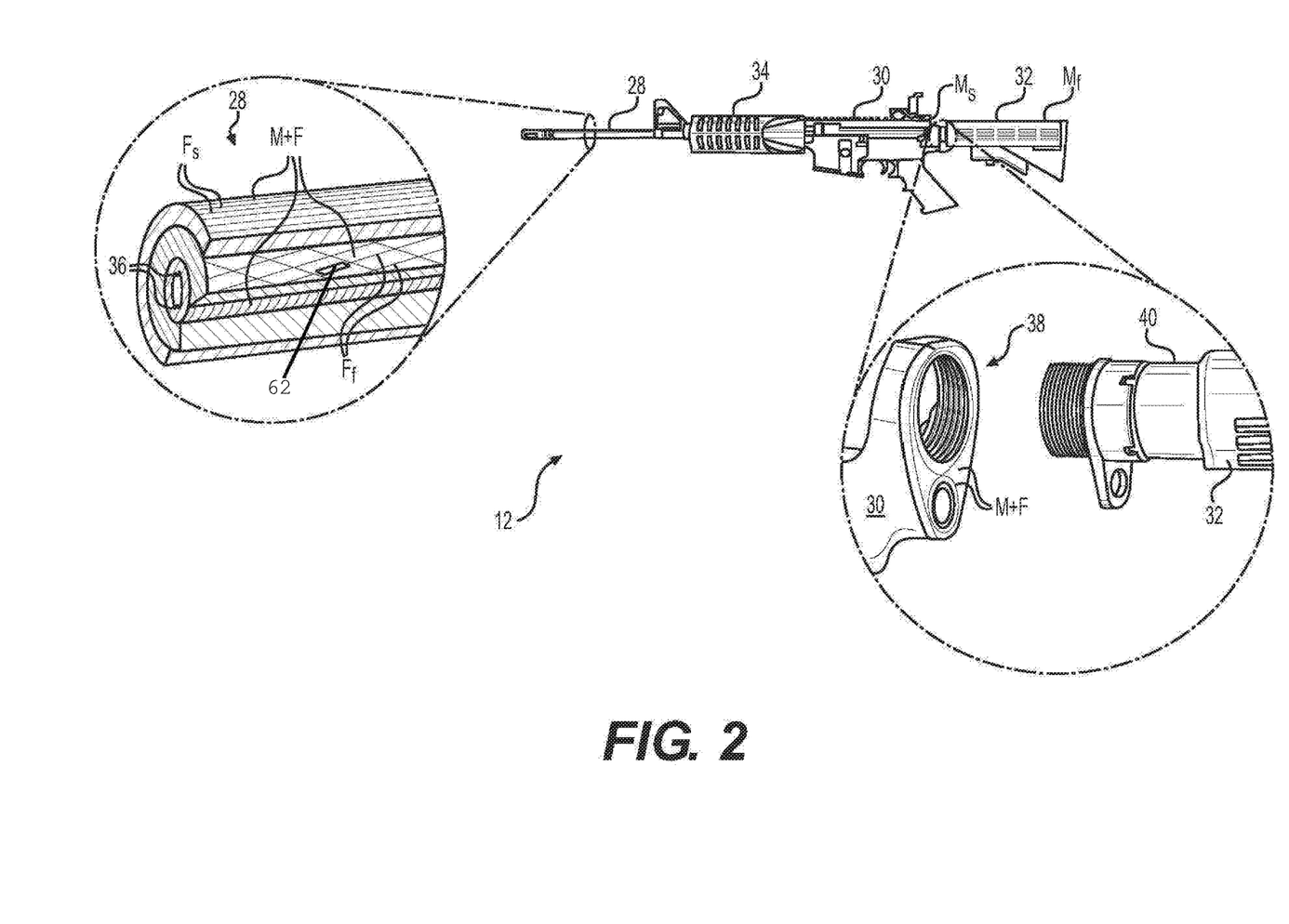
FIG. 2 is an isometric illustration of an exemplary sporting equipment that can be manufactured utilizing the system of FIG. 1.

FIG. 2 illustrates an exemplary embodiment of sporting equipment 12. In this embodiment, sporting equipment 12 is a gun, such as a firearm, a paintball marker, an air gun, etc. that can be used for hunting, paintball, skeet, biathlon, and other shooting-related sporting events. Sporting equipment 12 of FIG. 2 could be used for non-sporting (e.g., military and/or police) activities, if desired.

As a gun, sporting equipment 12 may include, among other things, a barrel 28, an action 30, a stock 32, and a foregrip 34. Barrel 28 may be received by action 30 at a base end, and stock 32 may connect to action 30 at a side opposite barrel 28. Foregrip 34 may annularly surround barrel 28 and be cantilevered from action 30. Each of these components may be available in a variety of configurations, shapes, sizes, colors, and calibers.

Each of the components of sporting equipment 12 may be formed via any combination of the first and second additive processes described above, and may consist of any number of different fibers (e.g., fibers of different materials, sizes, colors, and/or cross-sectional shapes) F overlapping and/or interweaving with each other in any pattern, at any location, and with any desired density. For example, single fibers or groupings of fibers may be coated with a matrix M and strategically discharged as tracks from head 24 (referring to FIG. 1) to create the general structure of sporting equipment 12, while other fibers or groupings of fibers may be interwoven to create hollow tubes that are coated with matrix and strategically discharged from head 16.

Each of the components of sporting equipment 12 may be separate from each other or integral, as desired. For example, barrel 28 is shown via a cutaway in foregrip 34 as being integral with action 30 (e.g., integral with an upper receiver portion of action 30). In this example, some or all of the fibers discharging from head(s) 16 and/or 24 (referring to FIG. 1) may be continuous through each of these components, such that thousands (if not millions) of fibers extend through intersections between the components, thereby creating strong mechanical connections without requiring the use of specialized hardware, glues, and/or heavy fasteners. Stock 32 and/or foregrip 34 may additionally or alternatively be integrally manufactured with action 30, if desired.

In one exemplary embodiment, some of the fibers within the composite material making up one or more portions of sporting equipment 12 have unique characteristics. For example, while a majority of sporting equipment 12 may comprise a structural type fiber $F_s$ (e.g., carbon fibers, fiberglass, or Kevlar fibers), some portions of sporting equipment 12 may include another type of fiber $F_f$ (e.g., electrically conductive fibers, optical fibers, shape memory fibers, etc.). The functional type of fibers $F_f$ may be selectively interwoven with the structural type fibers $F_s$ at strategic locations. For example, electrically conductive fibers $F_f$ may be located at high-stress regions (e.g., within barrel 28 and/or action 30) and used as strain gauges to detect loading conditions (e.g., discharging) of sporting equipment 12.

In a similar manner, optical fibers $F_f$ may be located at the same or other high-stress regions, and an energy beam may be passed therethrough. As these regions flex, the optical fibers $F_f$ may be squeezed and/or closed, thereby generating an optical feedback signal indicative of the flexing. This information may be used to determine shot initiation, a recoil effect on the user, a shot and/or recoil strength or direction, etc. In some embodiments, a receiving and/or interpreting device (e.g., an interrogator) may be embedded within the sporting equipment 12 and connected to the fiber Ff to receive, interpret, respond to, and/or remotely transmit the information.

The electrically conductive fibers $F_f$ and/or the optical fibers $F_f$ may be coated with another material (e.g., insulation, a strength enhancing layer, etc.), if desired. Other electrical components (e.g., resistors, capacitors, LEDs, switches, batteries, filters, RFID tags, etc.) 62 may be extruded through heads 16, 24 and/or automatically picked-and-placed (e.g., via attachments associated with heads 16 and/or 24) during discharge of the fibers $F_f$. Operation of these components may then be tuned and monitored to identify the user and/or to determine conditions of sporting equipment 12 and/or the user.

The configuration of fibers within any of the components of sporting equipment 12 (and/or the location/orientation relationship between the components) may be adjustable and/or user-customizable. Specifically, it has been determined that the material type, fiber size, color, shape, pattern, location, orientation, and/or density may be selectively adjusted to provide a desired performance of sporting equipment 12. These adjustments may be manually selected by an end-user and/or automatically selected based on characteristics of the user (e.g., based on a body scan of the user, monitored performance of the user, etc.).

As shown in the left-most enlargement of FIG. 2, because the matrix surrounding each fiber may be cured and harden immediately upon discharge, the fibers may not be required to lie in parallel flat layers on top of each other. Accordingly, the fibers making up barrel 28 (or another component of sporting equipment 12) may be oriented in any desired direction (e.g., parallel, spiraling, crisscrossing, etc.) and in any number of flat or concentric (or eccentric) annular layers. This may allow for interlocking and/or overlapping of unique fiber layers and/or for the creation of customizable (e.g., strengthening, rigidity-enhancing, flexibility-enhancing, vibration-dampening, impact-resisting) features.

As also shown in the left-most enlargement of FIG. 2, any number of riflings 36 may be formed within barrel 28. Riflings 36 maybe formed during an additive manufacturing process (e.g., during either or both of the first and second additive processes described above), for example by creating elongated voids (e.g., by inhibiting discharge of fibers and/or matrix) at the riflings' locations. Riflings 36 may also be formed during a subsequent subtractive process, for example by cutting away material from barrel 28. In the latter approach, head(s) 16 and/or 24 may deposit a layer of only matrix at an inner-most annular surface of barrel 28, such that the fibers making up barrel 28 are not damaged during the subtractive process used to make riflings 36.

In the exemplary embodiment shown in FIG. 2, the matrix within the composite material making up one or more portions of sporting equipment 12 has unique characteristics. For example, while a majority of sporting equipment 12 may comprise a structural-type matrix $M_s$, some portions of sporting equipment 12 (e.g., the inner annular surface of barrel 28, a butt portion of stock 32, and/or an outer surface of foregrip 34) may include another type of matrix $M_f$ (e.g., a pyrolized matrix that provides greater impact resistance, a rubberized matrix that provides impact cushioning or improved gripping, etc.). The other type of matrix $M_f$ may be selectively used to coat the fibers at strategic locations.

In some embodiments, one or more hardpoints 38 may be fabricated (e.g., via either the first or second additive processes described above) at predetermined sites within sporting equipment 12. Each hardpoint 38 may be generally devoid of fibers and fabricated in anticipation of a subsequent subtractive (e.g., drilling, reaming, tapping, etc.) process. An exemplary hardpoint 38 is shown in the right-most enlargement of FIG. 2. In this example, hardpoint 38 is intended as a mounting location for a buffer tube 40 contained within stock 32. As shown in this enlargement, hardpoint 38 has been drilled and tapped to receive corresponding threads of buffer tube 40. By creating hardpoint 38 generally devoid of fibers, the likelihood of the subsequent subtractive process damaging fibers may be low. In addition, the subtractive process may be simpler to complete (e.g., easier, quicker, and/or less equipment-damaging) without fibers present.

Hardpoints 38 may be manufactured to have a perimeter formed from fibers in a particular configuration. That is, instead of simply avoiding fiber discharge at the intended locations of hardpoints 38, head 24 may be cause to follow a predetermined trajectory around hardpoints 38 while discharging extra fibers, such that one or more walls of fibers are created at the perimeter. This may allow for increased strength, increased rigidity, and/or improved geometrical tolerances at hardpoints 38. Hardpoints 38 may have the same general thickness of surrounding regions or protrude from one or both opposing sides, as desired.

In some embodiments, hardpoint 38 may be fabricated from a material that is different than a surrounding material of sporting equipment 12. For example, hardpoint 38 may be fabricated from a different matrix material (e.g., a softer, harder, and/or more-easily machined matrix), from a different material type of fiber, and/or from a different form of fiber (e.g., chopped fiber or another filler). These differences may allow hardpoint 38 to have properties tailored for particular applications.

INDUSTRIAL APPLICABILITY

The disclosed arrangement and design of sporting equipment 12 may be used in connection with any sporting event. Sporting equipment 12 may be light-weight and low-cost, due to a reduction in the number of fasteners required to join the various components to each other. In addition, sporting equipment 12 may be light-weight do to the use of composite materials. High-performance may be provided in the unique ways that particular fibers, resins, and functional components are used and laid out within sporting equipment 12.

It will be apparent to those skilled in the art that various modifications and variations can be made to the disclosed sporting equipment. Other embodiments will be apparent to those skilled in the art from consideration of the specification and practice of the disclosed sporting equipment. For example, although sporting equipment 12 is described above as being fabricated from matrix-wetted reinforcements, it is contemplated that portions (e.g., structurally insignificant areas and/or an outer skin) of sporting equipment 12 may be fabricated from only the matrix, if desired. It is intended that the specification and examples be considered as exemplary only, with a true scope being indicated by the following claims and their equivalents.

What is claimed is:

1. A sporting equipment, comprising:
   a barrel;
   an action connected to a base end of the barrel;
   a stock connected to the action opposite the barrel; and
   an electrical component imbedded within at least one of the barrel and the action and at least one functional type of fiber connected to the electrical component,
   wherein at least the barrel and the action are fabricated as an integral component from a plurality of structural fibers that are continuous through at least the barrel and the action.

2. The sporting equipment of claim 1, wherein the electrical component is configured to generate a signal indicative of shot initiation.

3. The sporting equipment of claim 1, wherein the electrical component is at least one of a resistor, a capacitor, an LED, an RFID tag, a switch, a battery, a filter, and an interrogator.

4. The sporting equipment of claim 1, wherein the functional type of fiber includes at least one of an electrically conductive metallic fiber, an optical fiber, and a shape memory fiber located at least partially inside of the barrel.

5. The sporting equipment of claim 1, wherein the plurality of structural fibers include at least one of an aramid fiber, a carbon fiber, and a glass fiber.

6. The sporting equipment of claim 1, wherein the plurality of structural fibers passing through the barrel and the action are at least partially coated with different types of matrixes at different locations.

7. The sporting equipment of claim 1, wherein the plurality of structural fibers include fibers overlapping in directions and densities that are different at different locations along the barrel and action.

8. The sporting equipment of claim 1, further including a hardpoint formed within the action and configured to receive a portion of the stock, the hardpoint having a center free of fibers and a perimeter wall of fibers.

9. A sporting equipment, comprising:
   a barrel;
   an action connected to a base end of the barrel; and
   a stock connected to the action opposite the barrel,
   wherein at least the barrel is fabricated from a plurality of structural type of fibers and at least one of continuous electrically conductive metallic fiber, an optical fiber, and a shape memory fiber located at least partially inside of the barrel.

10. The sporting equipment of claim 9, wherein the structural type of fiber includes at least one of an aramid fiber, a carbon fiber, and a glass fiber.

11. The sporting equipment of claim 9, wherein the plurality of structural type of fibers are at least partially coated different types of matrixes at different locations.

12. The sporting equipment of claim 9, further including an electrical component imbedded within at least the barrel and connected to the at least one continuous electrically conductive metallic fiber, optical fiber, and shape memory fiber.

13. The sporting equipment of claim 12, wherein the electrical component is configured to generate a signal indicative of shot initiation.

14. The sporting equipment of claim 12, wherein the electrical component is at least one of a resistor, a capacitor, an LED, an RFID tag, a switch, a battery, a filter, and an interrogator.

15. A sporting equipment, comprising:
   a barrel;
   an action connected to a base end of the barrel; and
   a stock connected to the action opposite the barrel; and
   a plurality of structural fibers passing through at least one of the barrel, the action, and the stock, wherein the plurality of structural fibers are at least partially coated with different types of matrixes at different locations along their lengths.

16. The sporting equipment of claim 15, further including:
   at least one functional type of fiber located at least partially inside of the at least one of the barrel, the action, and the stock; and
   an electrical component imbedded within the at least one of the barrel, the action, and the stock and connected to the at least one functional type of fiber.

17. The sporting equipment of claim 16, wherein the electrical component is configured to generate a signal indicative of shot initiation.

18. The sporting equipment of claim 16, wherein the electrical component is at least one of a resistor, a capacitor, an LED, an RFID tag, a switch, a battery, a filter, and an interrogator.

* * * * *